(12) United States Patent
Vaughn et al.

(10) Patent No.: US 10,986,503 B2
(45) Date of Patent: *Apr. 20, 2021

(54) COOPERATIVE SECURITY IN WIRELESS SENSOR NETWORKS

(71) Applicant: Intel Corporation, Santa Clara, CA (US)

(72) Inventors: Robert Lawson Vaughn, Portland, OR (US); Osvaldo Diaz, Portland, OR (US); Siu Kit Wai, Lam Tin (HK); Igor Tatourian, Fountain Hills, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/418,761

(22) Filed: May 21, 2019

(65) Prior Publication Data

US 2020/0112858 A1    Apr. 9, 2020

Related U.S. Application Data

(63) Continuation of application No. 15/470,414, filed on Mar. 27, 2017, now Pat. No. 10,334,442, which is a
(Continued)

(51) Int. Cl.
*H04W 12/12* (2021.01)
*H04W 4/38* (2018.01)
(Continued)

(52) U.S. Cl.
CPC ........... *H04W 12/12* (2013.01); *H04L 63/104* (2013.01); *H04L 63/14* (2013.01); *H04W 4/38* (2018.02);
(Continued)

(58) Field of Classification Search
None
See application file for complete search history.

(56) References Cited

U.S. PATENT DOCUMENTS

| 9,609,517 B2 | 3/2017 | Vaughn et al. |
| 10,334,442 B2 | 6/2019 | Vaughn et al. |

(Continued)

FOREIGN PATENT DOCUMENTS

| CN | 107005790 | 8/2017 |
| JP | 2005536119 | 11/2005 |

(Continued)

OTHER PUBLICATIONS

"International Application Serial No. PCT US2015 062955, International Search Report dated Mar. 17, 2016", 3 pgs.

(Continued)

*Primary Examiner* — Fayyaz Alam
(74) *Attorney, Agent, or Firm* — Schwegman Lundberg & Woessner, P.A.

(57) ABSTRACT

Systems, apparatuses, and methods for cooperative security in wireless sensor networks are described herein. A wireless node may organize itself into a cluster with other wireless nodes. The wireless node may cooperate with other wireless nodes in the cluster to select a leader node. The wireless node may describe its expected behaviors. The wireless node may detect a compromised wireless node within the cluster. The wireless node may prevent the compromised wireless node from compromising another wireless node.

26 Claims, 5 Drawing Sheets

Related U.S. Application Data continuation of application No. 14/577,764, filed on Dec. 19, 2014, now Pat. No. 9,609,517.

(51) Int. Cl.
*H04L 29/06* (2006.01)
*H04W 24/04* (2009.01)
*H04W 24/02* (2009.01)
*H04W 84/20* (2009.01)

(52) U.S. Cl.
CPC ............ *H04W 24/04* (2013.01); *H04W 24/02* (2013.01); *H04W 84/20* (2013.01)

(56) References Cited

U.S. PATENT DOCUMENTS

| | | | |
|---|---|---|---|
| 2006/0253570 A1 | 11/2006 | Biswas et al. | |
| 2008/0084294 A1* | 4/2008 | Zhiying | H04W 4/70 340/539.22 |
| 2009/0168670 A1 | 7/2009 | Yang | |
| 2010/0100964 A1* | 4/2010 | Mahaffey | G06F 21/554 726/25 |
| 2010/0125437 A1* | 5/2010 | Vasseur | H04L 43/10 702/188 |
| 2012/0026898 A1* | 2/2012 | Sen | H04W 4/38 370/252 |
| 2012/0026938 A1* | 2/2012 | Pandey | H04L 43/065 370/328 |
| 2015/0288532 A1* | 10/2015 | Veyseh | H04L 12/283 370/310 |
| 2016/0099963 A1* | 4/2016 | Mahaffey | H04L 63/0227 726/25 |
| 2016/0183093 A1 | 6/2016 | Vaughn et al. | |
| 2017/0332239 A1 | 11/2017 | Vaughn et al. | |

FOREIGN PATENT DOCUMENTS

| | | |
|---|---|---|
| JP | 2007134839 | 5/2007 |
| JP | 2008283360 | 11/2008 |
| JP | 2012175296 | 9/2012 |
| JP | 2013530608 | 7/2013 |
| WO | 2006110199 | 10/2006 |
| WO | 2012143931 | 10/2012 |
| WO | 2014105893 | 7/2014 |
| WO | 2016099839 | 6/2016 |

OTHER PUBLICATIONS

"International Application Serial No. PCT US2015 062955, Written Opinion dated Mar. 17, 2016", 5 pgs.

"U.S. Appl. No. 14/577,764, Non Final Office Action dated Jul. 28, 2016", 30 pgs.

"U.S. Appl. No. 14/577,764, Response filed Oct. 28, 2016 to Non Final Office Action dated Jul. 28, 2016", 10 pgs.

"U.S. Appl. No. 14 577,764, Notice of Allowance dated Nov. 17, 2016", 8 pgs.

"International Application Serial No. PCT US2015 062955, International Preliminary Report on Patentability dated Jun. 29, 2017", 7 pgs.

"Korean Application Serial No. 10-2017-7013296, Voluntary Amendment filed Jul. 20, 2017", w claims in English, 14 pgs.

"U.S. Appl. No. 15/470,414, Preliminary Amendment filed Sep. 8, 2017", 8 pgs.

"U.S. Appl. No. 15/470,414, Non Final Office Action dated Oct. 6, 2017", 26 pgs.

"U.S. Appl. No. 15/470,414, Response filed Feb. 6, 2018 to Non Final Office Action dated Oct. 6, 2017", 9 pgs.

"U.S. Appl. No. 15/470,414, Examiner Interview Summary dated Feb. 13, 2018", 3 pgs.

"U.S. Appl. No. 15/470,414, Final Office Action dated Apr. 11, 2018", 34 pgs.

"U.S. Appl. No. 15/470,414, Response Filed Aug. 9, 2018 to Final Office Action dated Apr. 11, 2018", 11 pgs.

"U.S. Appl. No. 15/470,414, Non Final Office Action dated Aug. 16, 2018", 35 pgs.

"European Application Serial No. 15870633.3, Extended European Search Report dated Jul. 2, 2018", 8 pgs.

"U.S. Appl. No. 15/470,414, Response filed Jan. 15, 2019 to Non Final Office Action dated Aug. 16, 2018", 11 pgs.

"U.S. Appl. No. 15/470,414, Examiner Interview Summary dated Jan. 18, 2019", 3 pgs.

"U.S. Appl. No. 15/470,414, Notice of Allowance dated Feb. 8, 2019", 8 pgs.

"European Application Serial No. 15870633.3, Response filed Jan. 29, 2019 to Extended European Search Report dated Jul. 2, 2018", 11 pgs.

"Japanese Application Serial No. 2017-528811, Office Action dated Sep. 3, 2019", w English translation, 10 pgs.

"Japanese Application Serial No. 2017-528811, Response filed Dec. 2, 2019 to Office Action dated Sep. 3, 2019", w English claims, 9 pgs.

"Chinese Application Serial No. 201580063028.2, Office Action dated Mar. 4, 2020", W English Translation, 15 pgs.

U.S. Appl. No. 14/577,764, U.S. Pat. No. 9,609,517, filed Dec. 19, 2014, Cooperative Security in Wireless Sensor Networks.

U.S. Appl. No. 15/470,414, U.S. Pat. No. 10,334,442, filed Mar. 27, 2017, Cooperative Security in Wireless Sensor Networks.

* cited by examiner

COOPERATIVE SECURITY IN WIRELESS SENSOR NETWORKS

PRIORITY APPLICATION

This application is a continuation of U.S. application Ser. No. 15/470,414, filed Mar. 27, 2017, which is a continuation of U.S. application Ser. No. 14/577,764, filed Dec. 19, 2014, all of which are incorporated herein by reference in their entireties.

TECHNICAL FIELD

The present disclosure generally relates to wireless sensor networks and, in an embodiment, to cooperative security in wireless sensor networks.

BACKGROUND

A wireless sensor network (WSN) is a network of wireless nodes equipped with sensors to monitor physical or environmental conditions, such as temperature, air pressure, flow rate, sound pressure, etc. A wireless node transmits the data collected by its sensor to a destination. In an example, the wireless node may pass the data to another wireless node that is "closer" (either physically or logically) to the destination than the originating wireless node; this process continues until the data is delivered to the destination.

BRIEF DESCRIPTION OF THE DRAWINGS

Some embodiments are illustrated by way of example and not limitation in the figures of the accompanying drawings.

DETAILED DESCRIPTION

In the following detailed description, for purposes of explanation, numerous specific details are set forth in order to provide a thorough understanding of the various aspects of the presently disclosed subject matter. However, it will be to those skilled in the art that the presently disclosed subject matter may be practiced without these specific details. In other instances, well-known methods, procedures, and components have not been described in detail so as not to obscure the presently disclosed subject matter.

The use of wireless sensor networks is increasing rapidly in a variety of applications including in industrial settings, such as manufacturing, supply chain, and energy production/distribution. Furthermore, the quantity of wireless sensor nodes (e.g., devices j in deployments of wireless sensor networks continues to increase. It is common for some wireless sensor networks to have hundreds or even thousands of wireless sensor nodes. As the quantity of wireless sensor nodes increases, identifying nodes that have been compromised (e.g., by vines, malware, etc.) becomes increasingly complex. Accurately identifying compromised nodes while managing false positives in a timely manner may become a significant challenge.

As the quantity of wireless sensor nodes increases, wireless sensor nodes of wireless sensor networks may police themselves in an intelligent manner to (1) reduce the computing resources expended by backend/centralized facilities, (2) leverage commonality of function and proximity of devices to reduce network traffic, and (3) minimize false positive alerts. These objectives may be met by a cooperative security model that allows distributed wireless sensor nodes to pattern the expected behavior of nodes within the network and to react appropriately to deviations from the expected behavior.

In an embodiment, wireless sensor nodes (including nodes at the edges of the wireless sensor network) work in a cooperative manner to identify a compromised node and mitigate its chance of compromising other wireless sensor nodes in the network, whether upstream or downstream from the compromised node. The wireless sensor nodes cooperatively organize themselves into clusters, and each cluster chooses a leader node. The leader node uses machine learning techniques to create a model of expected behaviors of the nodes within its cluster, and then uses the model of expected behaviors to decide whether the observed behavior of a node within the cluster indicates that the node is compromised. The leader node compares observed behavior to the expected behavior, and based on these observations, determines that a wireless sensor node within its cluster is compromised. Upon determining that a wireless sensor node within its cluster is compromised, the leader mitigates the ability of the compromised node to compromise other nodes within the cluster.

Figure 1:
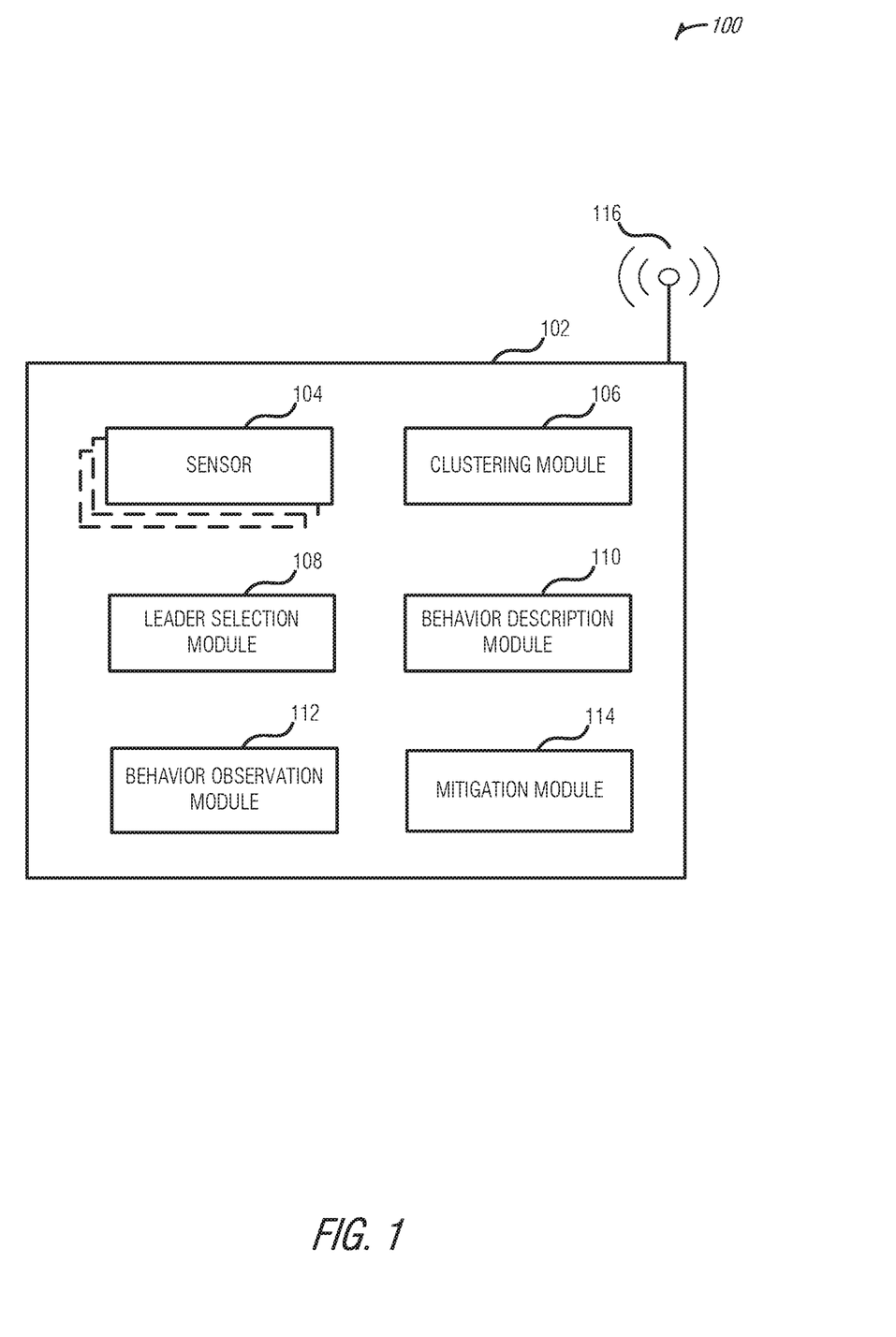
FIG. 1 is a block diagram of a wireless sensor node arranged to participate in cooperative security within a wireless sensor network, according to an embodiment.

FIG. 1 is a block diagram of a wireless sensor node 102 arranged (e.g., configured, designed, manufactured, etc.) to participate in cooperative security within a wireless sensor network according to an embodiment. In an embodiment, wireless sensor node 102 includes a set of sensors 104. In an embodiment, sensor set 104 includes one sensor. In an embodiment, sensor 104 is arranged to monitor one or more physical and/or environmental conditions, such as temperature, air pressure, flow rate, sound pressure, pH level, radioactivity, etc. In an embodiment, sensor set 104 includes multiple sensors, each of which is arranged to monitor one or more physical and/or environmental conditions, some which may differ from one another. For example, one sensor s arranged to monitor temperature, while another sensor is arranged to monitor flow rate.

In an embodiment, wireless sensor node 102 includes at least one antenna 116, which the wireless sensor node 102 uses for data transmissions (both inbound and outbound). In an embodiment, wireless sensor node 102 acquires data collected by the sensor 104, and transmits this data in either real-time, substantially near real-time, or in batch mode. In an embodiment, wireless sensor node 102 is arranged to analyze or transform some of the data collected by sensor 104 prior to transmitting the data. In an embodiment, wireless sensor node 102 is arranged to add to or remove from the data collected by sensor 104 prior to transmitting the data. In an embodiment, wireless sensor node 102 is arranged to selectively refuse to transmit some or all of the data collected by sensor 104.

In an embodiment, wireless sensor node 102 includes clustering module 106. In an embodiment, clustering module 106 of wireless sensor node 102 is arranged to cooperate with other wireless sensor nodes 102 in the wireless network to organize wireless sensor node 102 into a cluster with the other wireless sensor nodes 102. In an embodiment, a cluster of wireless sensor nodes 102 is arranged to form based on proximity (either physical proximity, network proximity, and/or logical proximity), on the type(s) of sensor(s) 104 included in wireless sensor nodes 102, on a level of redundancy to be created within the cluster, on hardware and/or software capabilities of the wireless sensor nodes 102, etc., or some combination thereof.

In an embodiment, wireless sensor node 102 includes leader selection module 108. In an embodiment, leader selection module 108 of wireless sensor node 102 is arranged to cooperate with the leader selection modules 108 of the other wireless sensor nodes 102 in the cluster to select one of the wireless sensor nodes 102 in the cluster to be the leader node for the cluster.

In an embodiment, upon a wireless sensor node 102 having been selected as leader node by the wireless sensor nodes 102 within its cluster, the leader node is arranged to proxy all communications to be transmitted out of or to be received by a wireless sensor node 102 within the cluster. The leader node continues to proxy all communications into and out of the cluster until another leader node is chosen and/or until the leader node determines itself to have been compromised.

In an embodiment, wireless sensor node 102 includes behavior description module 110. In an embodiment, behavior description module 10 is arranged to describe the expected behavior of wireless sensor node 102. In an embodiment, behavior description module 110 is arranged to describe the expected behavior of wireless sensor node 102 by describing one or more data parameters to be transmitted by or to be received by the wireless sensor node 102. A data parameter may be a data sample collected by a sensor 104, a data sample collected by a sensor 104 and modified by wireless sensor node 102 (e.g., converting between metric values and U.S./Imperial values), data generated by wireless sensor node 102 (e.g., node ID, up-time, GPS coordinates, etc.), or data wireless sensor node 102 expects to receive (e.g., cluster ID, operational instructions from the leader node of the cluster, etc.).

In an embodiment, a data parameter includes the name of the parameter, a data type for the parameter (e.g., date, time, integer, datetime, long, double, etc.), and a valid range for the parameter. In an embodiment, the range is indicated by a bottom value that indicates the lowest value of the data type allowed for the parameter (e.g., −100) and a top value that indicates the highest value of the data type allowed for parameter (e.g., 3000). In an embodiment, the behavior description module 110 is arranged to describe the expected behaviors of the wireless sensor node 102 using Extensible Markup Language (XML), JavaScript Object Notation (JSON), YAML (YAML Ain't Markup Language), or some other data representation. In an embodiment, a description of expected behavior of wireless sensor node 102 includes a digital signature from a trusted third party. In an embodiment, the digital signature is used to verify that the description of expected behavior for wireless sensor node 102 has not been modified or corrupted. In an embodiment, the behavior description module 110 of wireless sensor node 102 is arranged to be configurable after the wireless sensor node 102 has been deployed. In an embodiment, the behavior description module 110 of wireless sensor node 102 is arranged to be configurable while the wireless sensor node 102 is operating. In an embodiment, the behavior description module 110 of wireless sensor node 102 is arranged to be configurable with descriptions of updated or new data parameters to describe a new expected behavior for the wireless sensor node 102.

In an embodiment, behavior description module 110 is arranged to broadcast the description of its expected behaviors to other wireless sensor nodes 102; in an embodiment, the broadcast is directed only to the other wireless sensor nodes 102 within the cluster. In an embodiment, behavior description module 110 is arranged to provide the description of its expected behaviors through an application programming interface (API); in an embodiment, only the other wireless sensor nodes 102 within a cluster have access to or may successfully receive data from the API of another wireless sensor node 102 within the cluster.

In an embodiment, wireless sensor node 102 and/or one or more sensors 104 are configurable. In such embodiments, behavior description module 110 is also configurable to reflect the expected behaviors of the new configuration of wireless sensor node 102 and/or one or more sensors 104.

In an embodiment, wireless sensor node 102 includes behavior observation module 112. In an embodiment, behavior observation module 112 is arranged to operate only when the wireless sensor node 102 is the leader node of its cluster of wireless sensor nodes 102.

In an embodiment, behavior observation module 112 is arranged to detect a compromised wireless sensor node 102 within the cluster by receiving descriptions of the expected behaviors of each wireless sensor nodes 102 within the cluster, observing behaviors (e.g., communications) of the wireless sensor nodes 102 within the cluster, and identifying anomalies in communications of suspected wireless sensor nodes 102 by comparing the expected behaviors with the observed behaviors.

In an embodiment, behavior observation module 112 utilizes one or more machine learning algorithms to identify anomalies in communications of suspected wireless sensor nodes 102. The machine learning algorithm uses one or more statistical models (e.g., topic models) in its analyses of wireless sensor node 102 communications. Some statistical models used by the machine learning algorithm include, but are not limited to, an amount or degree of deviation from the description of expected behavior for the analyzed wireless sensor node 102, a proximity of the analyzed wireless sensor node 102 to similar wireless sensor nodes 102, the number of and/or the nature of attempts by the analyzed wireless sensor node 102 to probe other wireless sensor nodes 102, and the number and the type of ports open or closed on the analyzed wireless sensor node 102.

In an embodiment, behavior observation module 112 is arranged to calculate a threat level of an analyzed wireless sensor node 102 by weighing at least one of several factors, including but not limited to, an amount or degree of deviation from the description of expected behavior for the analyzed wireless sensor node 102, a proximity of the analyzed wireless sensor node 102 to similar wireless sensor nodes 102, the number of and/or the nature of attempts by the analyzed wireless sensor node 102 to probe other wireless sensor nodes 102; and the number and the type of ports open or closed on the analyzed wireless sensor node 102. In an embodiment, threat level is measured on a variable scale rather than simply binary (e.g., compromised or uncompromised). In an embodiment, behavior observation module 112 determines that the analyzed wireless sensor node 102 has been compromised based on the calculated threat level for the analyzed wireless sensor node 102.

In an embodiment, wireless sensor node 102 includes a mitigation module 114. In an embodiment, mitigation module 114 is arranged to prevent a compromised wireless sensor node 102 from compromising other wireless sensor nodes 102 in the cluster. In an embodiment, mitigation module 114 is arranged to operate only when the wireless sensor node 102 is the leader node of its cluster of wireless sensor nodes 102.

In an embodiment, mitigation module 114 is arranged to prevent a compromised wireless sensor node 102 from compromising other wireless sensor nodes 102 in the cluster by refusing to transmit some or all communications generated by or to be delivered to the compromised wireless sensor node 102. In an embodiment, mitigation module 114 is arranged to prevent a compromised wireless sensor node 102 from compromising other wireless sensor nodes 102 in the cluster by forcing the compromised wireless sensor node 102 to reset itself to an uncompromised state (e.g., factory reset).

In an embodiment, a suspected wireless sensor node 102 that has been determined to be compromised may periodically be reevaluated. In an example, the revaluation may be undertaken by a third-party entity device. Such a reevaluation may ascertain whether the suspected wireless sensor node 102 is compromised via standard threat detection mechanisms. If the suspected wireless sensor node 102 passes the reevaluation, the aberrant behavior may be attributed to proper emergent behavior based on, for example, changed conditions.

In an embodiment, a suspected wireless sensor node 102 that has been determined to be compromised may object to this determination. In an embodiment, the objection by suspected wireless sensor node 102 triggers a proof operation. In an embodiment, the proof operation includes the leader node of the cluster requesting a current description of the expected behaviors of suspected wireless sensor node 102 and comparing the current description of expected behavior of suspected wireless sensor node 102 to the previous description of expected behavior of suspected wireless sensor node 102; if a difference is detected between the current and previous description of expected behavior, the leader node reanalyzes the behavior of suspected wireless sensor node 102 (which lead to the determination that suspected wireless sensor node 102 was compromised) in light of the current description of expected behavior. In an embodiment, if the reanalysis of the behavior of suspected wireless sensor node 102 results in a determination that suspected wireless sensor node 102 is not compromised, the mitigation module 114 clears suspected wireless sensor node 102 of its "compromised" status, and allows suspected wireless sensor node 102 to continue operating.

Figure 2:
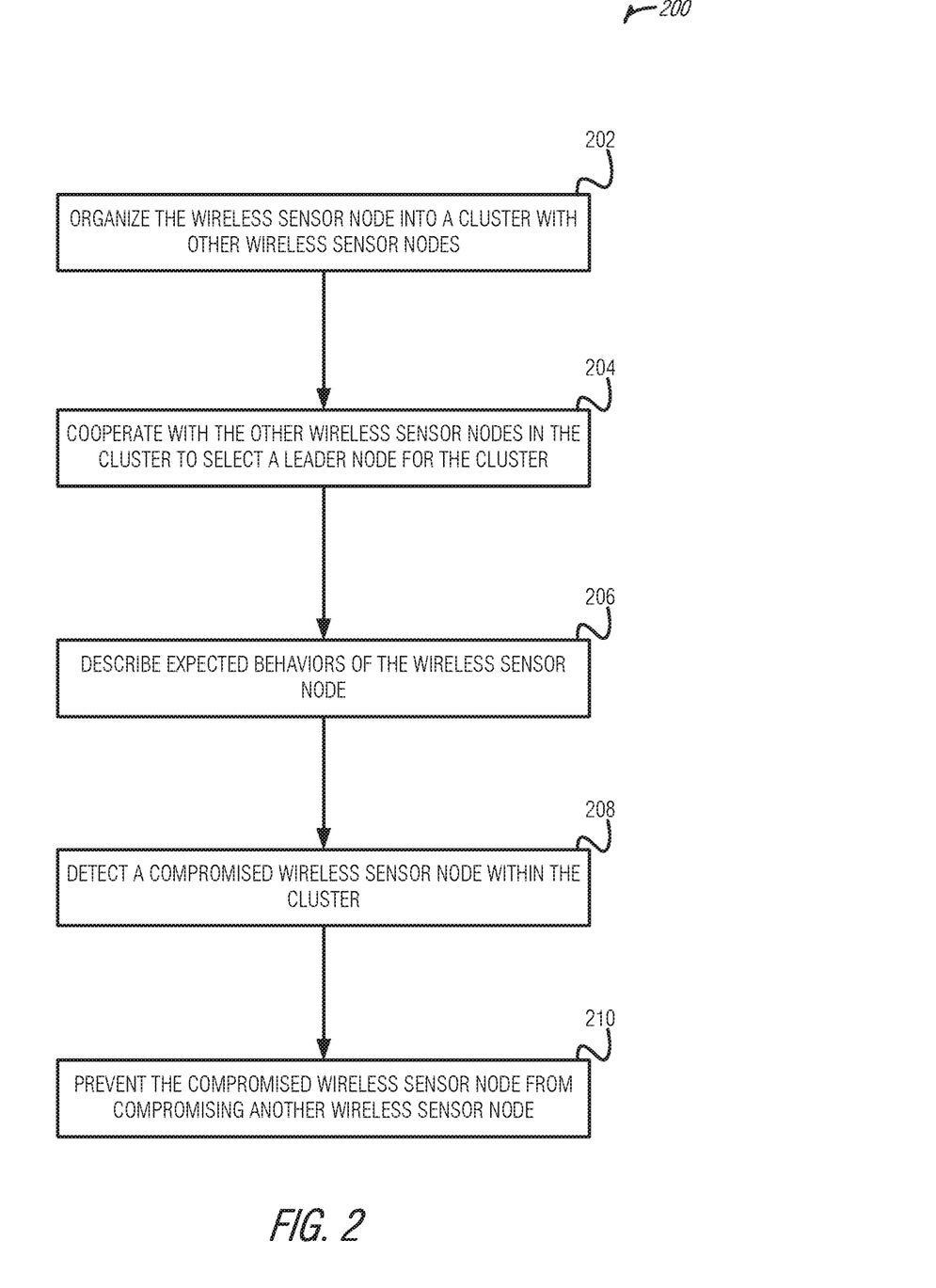
FIG. 2 is a flowchart illustrating a process performed by a wireless sensor node within a wireless sensor network employing cooperative security, according to an embodiment.

FIG. 2 is a flowchart illustrating a process 200 performed by a wireless sensor node (e.g., wireless sensor node 102, described above with respect to FIG. 1) within a wireless sensor network employing cooperative security, in accordance with some example embodiments. In an embodiment, wireless sensor node 102 organizes a cluster of wireless sensor nodes 102 (including itself) by cooperating with other wireless sensor nodes 102 in the wireless network (operation 202).

In an embodiment, wireless sensor node 102 cooperates with the other wireless sensor nodes 102 in the cluster to select a leader node for the cluster (operation 204).

In an embodiment, wireless sensor node 102 describes the behaviors that are to be expected for wireless sensor node 102, and makes its behavior descriptions available to the other wireless sensor nodes 102 in its cluster (operation 206).

In an embodiment where wireless sensor ode 102 is the leader node of its cluster, wireless sensor node 102 analyzes the actual behaviors of the other wireless sensor nodes 102 in its cluster, and detects a compromised wireless sensor node 102 by comparing the actual behavior of the wireless sensor node 102 to the description of the expected behavior for wireless sensor node 102 (operation 208).

In an embodiment where wireless sensor node 102 is the leader node of its cluster, wireless sensor node 102 prevents a compromised wireless sensor node 102 from compromising the other wireless sensor nodes 102 in its cluster (operation 210).

Figure 3:
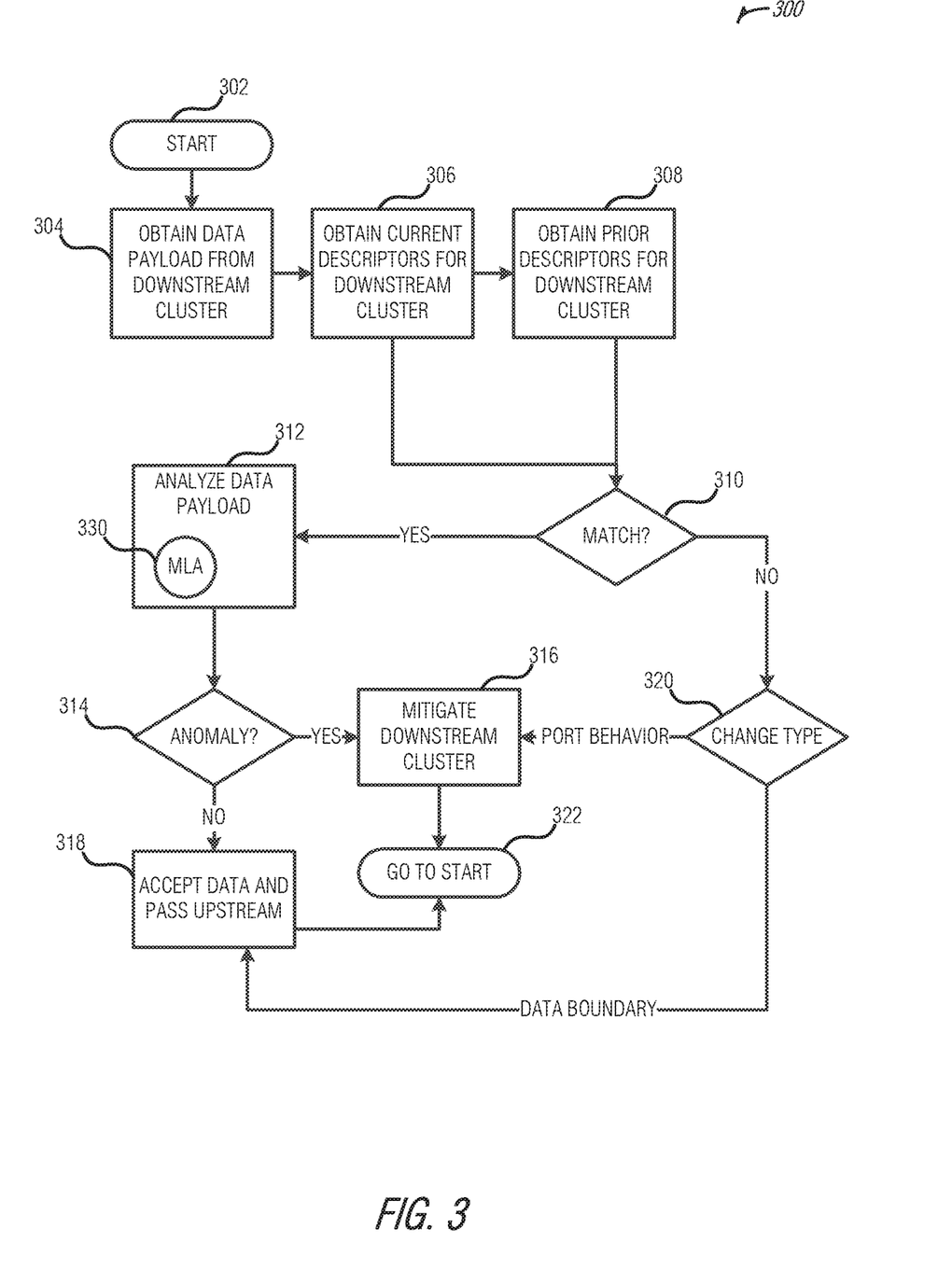
FIG. 3 is a flowchart illustrating a process performed by an upstream cluster in analyzing communications from downstream clusters, according to an embodiment.

FIG. 3 is a flowchart illustrating a process 300 performed by an upstream cluster in analyzing communications from downstream clusters, in accordance with some example embodiments. An upstream cluster (e.g., a cluster that is closer to a destination where data is to be sent) is "higher" in the hierarchy than a downstream cluster (e.g., a cluster that is further away from a destination where data is to be sent). In an embodiment where wireless sensor node 102 is its cluster's leader node, the wireless sensor node 102 performs an "inter-cluster" health check for the cluster by sharing with its neighbor cluster(s) the descriptions of the expected behaviors of the nodes in its cluster. The neighbor cluster(s) then analyze(s) the actual behavior of the cluster and detects the cluster as compromised by comparing the actual behavior of the cluster to the description of the expected behavior for cluster, similar to the "intra-cluster" health checks performed by a leader node within its own cluster. If a neighbor cluster determines the cluster to be compromised, the neighbor cluster performs "inter-cluster" mitigation, similar to the "intra-cluster" mitigation performed by a leader node within its own cluster.

In an embodiment, clusters of wireless sensor nodes 102 within the wireless network organize themselves into a "cluster of clusters" or "super cluster" in the same way that wireless sensor nodes 102 organize themselves into clusters. In an embodiment, the clustering module 106 and leader selection module 108 of the leader node of the cluster cooperates with the clustering modules 106 and leader selection modules 108 of the leader nodes of other clusters to organize into a cluster of clusters. In an embodiment, this process is recursive in that super clusters may organize with other clusters or other super clusters to form a larger super cluster.

In an embodiment, clusters are organized hierarchically. For example, the cluster hierarchy may be tree-based, linear, or some combination thereof. In an embodiment, a cluster is restricted to communicating with one or more downstream clusters and one or more upstream clusters. In an embodiment, MAC/VLAN filtering with ARP tables is used to restrict the communications of the cluster to its assigned upstream and downstream cluster(s).

In an embodiment, the upstream cluster starts the process 300 of analyzing communications from downstream clusters (operation 302). In an embodiment, the upstream cluster obtains, from a downstream cluster, a data payload containing actual behavior for the downstream cluster (operation 304).

In an embodiment, the upstream cluster obtains the current description of expected behavior for the downstream cluster (operation 306). In an embodiment, the upstream cluster obtains the prior description of expected behavior for the downstream cluster (operation 308). In an embodiment, the upstream cluster determines (operation 310) whether the current description of expected behavior for the downstream cluster (obtained at operation 306) matches the prior description of expected behavior for the downstream cluster (obtained at operation 308).

If the current description of expected behavior for the downstream cluster matches the prior description of expected behavior for the downstream cluster, the upstream cluster proceeds to analyze (operation 312) the data payload (obtained at operation 304). In an embodiment, the upstream cluster utilizes one or more machine learning algorithms 330 to analyze the data payload. In an embodiment, the upstream cluster determines (operation 314) whether the data payload contains a behavioral anomaly. In an embodiment, if an anomaly exists in the data payload, the upstream cluster considers the downstream cluster to be compromised and mitigates the compromised downstream cluster (operation 316) and the process 300 restarts (operation 322). In an embodiment, mitigating the downstream cluster includes causing the downstream cluster to reset itself to an uncompromised state (e.g., each cluster in and each wireless sensor node 102 in the downstream cluster is forced to reset to an uncompromised state). In an embodiment, if an anomaly does not exist in the data payload, the upstream cluster accepts the data payload and passes the data payload upstream to its upstream cluster.

In an embodiment, if the upstream cluster determines (operation 310) that the current description of expected behavior for the downstream cluster does not match the prior description of expected behavior for the downstream cluster, the upstream cluster determines (operation 320) the type of change in the current description of expected behavior. In an embodiment, if the type of change is a data boundary change (e.g., a range value for a data parameter has changed), the upstream cluster causes the current description of expected behavior for the downstream cluster to be stored, accepts the data payload and passes the data payload upstream to its upstream cluster (operation 318), and restarts process 300 (operation 322). In an embodiment, if the type of change involves port behavior of the downstream cluster, the upstream cluster considers the downstream cluster to be compromised and mitigates the compromised downstream cluster (operation 316) and the process 300 restarts (operation 322).

An additional approach for anomaly and threat detection is to use lockstep voting. For example, in 2-in-3 lockstep voting, leaders of three clusters compare their data and vote. If measurements from only two clusters are similar, then the third cluster is determined to have an anomaly. The cluster with the anomaly will then be monitored by the other two clusters to determine whether the anomaly represents a one-time error or a compromised cluster. In some such embodiments, the cardinality (e.g., quantity of nodes) for each cluster is limited to a small quantity of nodes to allow such functionality. In an embodiment, the voting is performed by all three cluster receiving data from the other two clusters, computing the measurements, and then exchanging their findings; the two clusters that match are then allowed to report to an upstream cluster.

Figure 4:
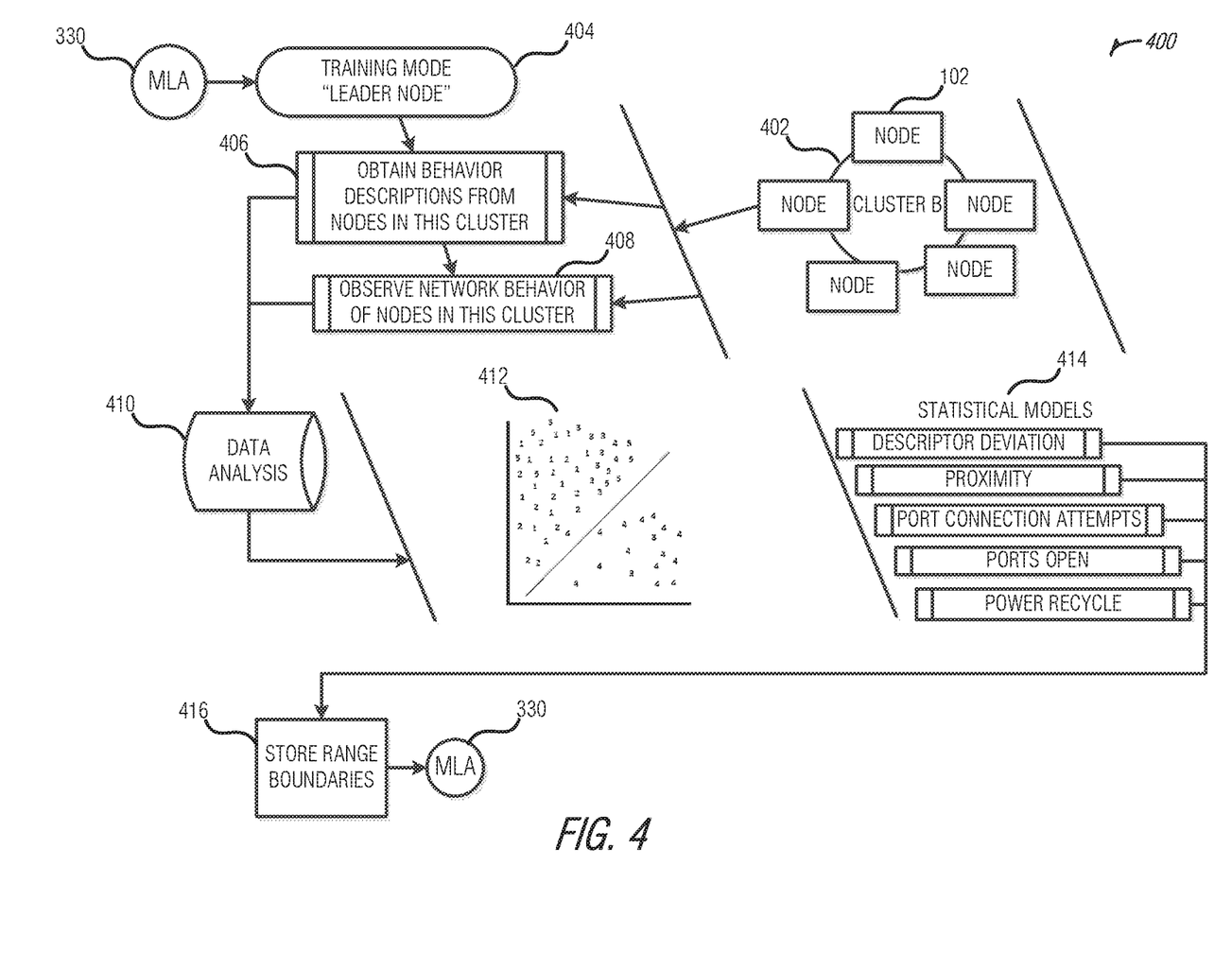
FIG. 4 is an illustration of a machine learning process for observing behavior of wireless sensor nodes within a cluster to develop a model of expected behavior for the wireless sensor nodes within the cluster, according to an embodiment.

FIG. 4 is an illustration of a machine earning process 400 for observing behavior of wireless sensor nodes 102 within a cluster 402 to develop a model of expected behavior for the wireless sensor nodes 102 within the cluster 402, in accordance with some example embodiments.

In an embodiment, when a wireless sensor node 102 within a cluster 402 is the leader node, machine learning algorithm 330 within wireless sensor node 102 enters training mode 404. In an embodiment, machine learning algorithm 330 obtains descriptions of expected behaviors from the wireless sensor nodes 102 within its cluster (operation 406). In an embodiment, machine learning algorithm 330 observes the network behaviors of each wireless sensor node 102 within its cluster by storing the data transmitted from or to each wireless sensor node 102 within its cluster (operation 408).

In an embodiment, machine learning algorithm 330 proceeds to perform data analysis (operation 410) on the descriptions of expected behaviors (obtained at operation 406) and the stored data transmissions (obtained at operation 408). In an embodiment, the data analysis (operation 410) includes classification (operation 412) of samples from the stored data transmissions. In an embodiment, the machine learning algorithm 330 uses one or more statistical models 414 in its data analysis. Some statistical models used by the machine learning algorithm include, but are not limited to, an amount or degree the data transmissions of the analyzed wireless sensor node 102 deviate from the description of expected behavior for the analyzed wireless sensor node 102, a proximity of the analyzed wireless sensor node 102 to similar wireless sensor nodes 102, the number of and/or the nature of attempts by the analyzed wireless sensor node 102 to probe other wireless sensor nodes 102, the number and the type of ports open or closed on the analyzed wireless sensor node 102, and the power recycle for analyzed wireless sensor node 102.

In an embodiment, after the data analysis (operation 410) is complete, machine learning algorithm 330 stores the range boundaries (operation 416) output by the data analysis, and exits training mode 404.

Figure 5:
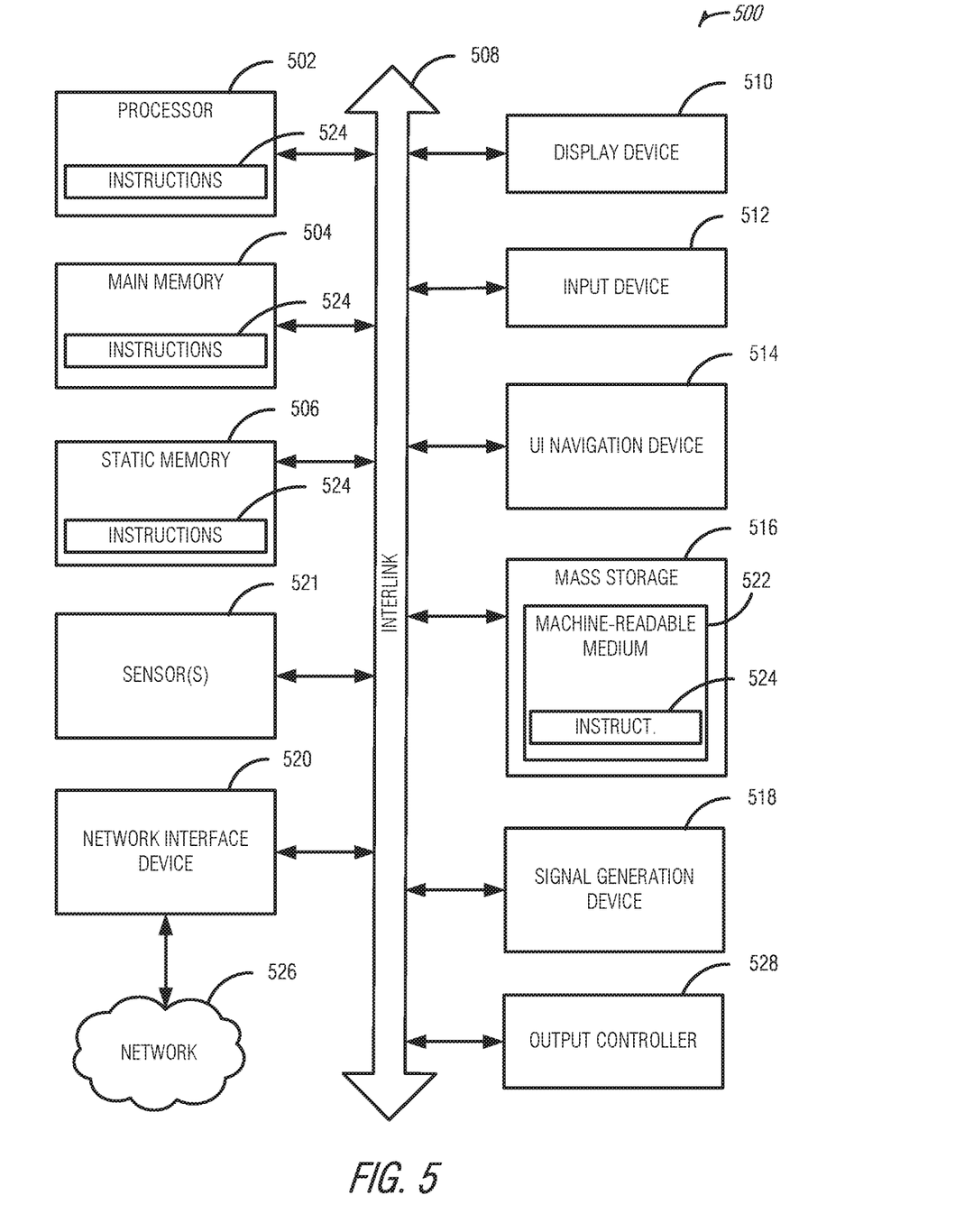
FIG. 5 is a block diagram illustrating an example of a machine, upon which one or more example embodiments may be implemented.

FIG. 5 illustrates a block diagram of an example machine 500 upon which any one or more of the techniques (e.g., methodologies) discussed herein may perform. In an embodiment, the machine 500 is connected (e.g., networked) to other machines. In a networked deployment, the machine 500 may operate in the capacity of a server machine, a client machine, or both a client machine and a server machine in server-client network environments. In an embodiment, the machine 500 acts as a peer machine in peer-to-peer (P2P) (or other distributed) network environment. In an embodiment, machine 500 is a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may perform, alone or in combination, specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a machine-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the machine-readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display device 510, an input device 512 (e.g., buttons, switches, a keyboard, etc.), and a user interface (UI) navigation device 514 (e.g., a pointing stick, an isometric joystick or other isometric device, etc.). In an embodiment, the display device 510, input device 512, and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (OPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine-readable medium 522, on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine-readable media.

Although the machine-readable medium 522 is illustrated as a single medium, the term "machine-readable medium" may include a single medium or multiple media a centralized or distributed database, and/or associated caches and servers) arranged to store the one or more instructions 524.

The term "machine-readable medium" may include any medium that is capable of storing, encoding, or carrying instructions for execution by the machine 500 and that cause the machine 500 to perform any one or more of die techniques of the present disclosure, or that is capable of storing, encoding or carrying data structures used by or associated with such instructions. Non-limiting machine-readable medium examples may include solid-state memories, and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, IEEE 802.15.1 family of standards (known as Bluetooth®), peer-to-peer (P2P) networks, among others. In an embodiment, the network interface device 520 may include one or more physical jacks (e.g., Ethernet, coaxial, or phone jacks) and/or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

The various operations of example methods described herein may be performed, at least partially, by one or more processors that are temporarily arranged (e.g., by software instructions) or permanently arranged to perform the relevant operations. Whether temporarily or permanently arranged, such processors may constitute processor-implemented modules or objects that operate to perform one or more operations or functions. The modules and objects referred to herein, in some example embodiments, may comprise processor-implemented modules and/or objects.

Similarly, the methods described herein may be at least partially processor-implemented. For example, at least some of the operations of a method may be performed by one or more processors or processor-implemented modules. The performance of certain operations may be distributed among the one or more processors, not only residing within a single machine or computer, but also deployed across a number of machines or computers. In some example embodiments, the processor or processors may be located in a single location (e.g., within a home environment, an office environment, at a server farm, etc.), while in other embodiments, the processors may be distributed across a number of locations.

The one or more processors may also operate to support performance of the relevant operations in a "cloud computing" environment or within the context of software as a service (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

ADDITIONAL NOTES & EXAMPLE EMBODIMENTS

Example 1 includes subject matter (such as a device, apparatus, or machine) comprising: a sensor to acquire data; a clustering module to organize the wireless device into a cluster with other wireless devices from a plurality of wireless devices in a wireless network; a leader selection module to cooperate with the other wireless devices in the cluster to select a leader for the cluster; a behavior description module to describe expected behaviors of the wireless device; a behavior observation module to detect a compromised wireless device within the cluster; and a mitigation module to prevent the compromised wireless device from compromising another wireless device.

In Example 2, the subject matter of Example 1 may include, wherein the behavior observation module of the wireless device is to detect while the wireless device is the leader of the cluster.

In Example 3, the subject matter of any one of Examples 1 to 2 may include, wherein the mitigation module of the wireless device is to prevent the compromised wireless device from compromising another wireless device while the wireless device is the leader of the cluster.

In Example 4, the subject latter of any one of Examples 1 to 3 may include, wherein to prevent the compromised wireless device from compromising another wireless device includes the mitigation module to instruct the other wireless devices in the cluster to select a new leader for the cluster response to being compromised.

In Example 5, the subject matter of any one of Examples 1 to 4 may include, wherein to detect a compromised wireless device includes the behavior observation module to: analyze communications of a suspected wireless device; and identify anomalies in the communications of the suspected wireless device.

In Example 6, the subject matter of any one of Examples 1 to 5 may include, wherein to identify anomalies in communications of the suspected wireless device includes the behavior observation module to utilize a machine learning algorithm.

In Example 7, the subject matter of any one of Examples 1 to 6 may include, wherein the behavior observation module is to calculate a threat level of the suspected wireless device based on at least one of: amount of deviation from described expected behavior of the suspected wireless device; proximity of the suspected wireless device to similar wireless devices; attempts by the suspected wireless device to probe other wireless devices; and number and type of ports open on the suspected wireless device.

In Example 8, the subject matter of any one of Examples 1 to 7 may include, wherein the behavior observation module is to determine the suspected wireless device as compromised based on the calculated threat level of the suspected wireless device.

In Example 9, the subject matter of any one of Examples 1 to 8 may include, wherein the leader of the cluster is to proxy all communications that are to be transmitted by or to be received by any other wireless device in the cluster.

In Example 10, the subject matter of any one of Examples 1 to 9 may include, wherein the mitigation module of the wireless device is to prevent the compromised wireless device from compromising another wireless device by refusing to transmit a communication generated by the compromised wireless device.

In Example 11, the subject matter of any one of Examples 1 to 10 may include, wherein the mitigation module of the wireless device is to prevent the compromised wireless device from compromising another wireless device by, refusing to transmit a communication to be delivered to the compromised wireless device.

In Example 12, the subject matter of any one of Examples 1 to 11 may include, wherein the mitigation module of the wireless device is to prevent the compromised wireless device from compromising another wireless device by forcing the compromised wireless device to reset itself to an uncompromised state.

In Example 13, the subject matter of any one of Examples 1 to 12 may include, wherein the cluster comprises wireless devices of a similar type.

In Example 14, the subject matter of any one of Examples 1 to 13 may include, wherein the wireless devices in the cluster are redundant.

In Example 15, the subject matter of any one of Examples 1 to 14 may include, wherein the plurality of wireless devices are organized into a plurality of clusters.

In Example 16, the subject matter of any one of Examples 1 to 15 may include, wherein each cluster is to perform health checks by sharing, with its neighbor clusters, its described expected behaviors and its sensor data.

In Example 17, the subject matter of any one of Examples 1 to 16 may include, wherein a subset of clusters within the plurality of clusters are organized into a cluster of clusters.

In Example 18, the subject matter of any one of Examples 1 to 17 may include, wherein a selected cluster within the plurality of clusters is to: create a super cluster by combining the selected cluster with other clusters from the plurality of clusters; cooperate with the other clusters in the super cluster to select a leader cluster for the super cluster; describe expected behaviors of the selected cluster; detect a compromised cluster within the super cluster; and prevent the compromised cluster from compromising another cluster.

In Example 19, the subject matter of any one of Examples 1 to 18 may include, wherein the plurality of clusters are organized hierarchically.

In Example 20, the subject matter of any one of Examples 1 to 19 may include, wherein an upstream cluster is hierarchically higher than a downstream cluster.

In Example 21, the subject matter of any one of Examples 1 to 20 may include, wherein the behavior description module is to describe expected behaviors of the wireless device using XML.

In Example 22, the subject matter of any one of Examples 1 to 21 may include, wherein the behavior description module is to broadcast the described expected behaviors of the wireless device.

In Example 23, the subject matter of any one of Examples 1 to 22 may include, wherein the behavior description module is to provide, through an application programming interface, the described expected behaviors of the wireless device.

In Example 24, the subject matter of any one of Examples 1 to 23 may include, wherein the behavior description module is to describe expected behaviors of the wireless device by describing a parameter to be transmitted by or to be received by the wireless device, the parameter a name: a data type; and a range including: a bottom value, indicating a lowest value of the data type allowed for the parameter; and a top value, indicating a highest value of the data type allowed for parameter.

In Example 25, the subject matter of any one of Examples 1 to 24 may include, wherein the wireless device is configurable by an end customer.

Example 26 includes subject matter (such as a method, means for performing acts, machine readable medium including instructions that when performed by a machine cause the machine to performs acts, or an apparatus to perform) for securing a wireless sensor network comprising a plurality of wireless devices, the method performed by a wireless device in the plurality, the method comprising: organizing the wireless device into a cluster with other wireless devices from the plurality; cooperating with the other wireless devices in the cluster to select a leader for the cluster; describing expected behaviors of the wireless device; detecting a compromised wireless device within the cluster; and preventing the compromised wireless device from compromising another wireless device.

In Example 27, the subject matter of Example 26 may include, wherein the detecting is performed while the wireless device is the leader of the cluster.

In Example 28, the subject matter of any one of Examples 26 to 27 may include, wherein the preventing is performed while the wireless device is the leader of the cluster.

In Example 29, the subject matter of any one of Examples 26 to 28 may include, wherein preventing the compromised wireless device from compromising another wireless device includes instructing the other wireless devices in the cluster to select a new leader for the cluster in response to being compromised.

In Example 30, the subject matter of any one of Examples 26 to 29 may include, wherein detecting a compromised wireless device within the cluster includes: analyzing communications of a suspected wireless device; and identifying anomalies in the communications of the suspected wireless device.

In Example 31, the subject matter of any one of Examples 26 to 30 may include, wherein identifying anomalies in communications of the suspected wireless device includes utilizing a machine learning algorithm.

In Example 32, the subject matter of any one of Examples 26 to 31 may include, wherein detecting includes calculating a threat level of the suspected wireless device based on at least one of: amount of deviation from described expected behavior of the suspected wireless device; proximity of the suspected wireless device to similar wireless devices; attempts by the suspected wireless device to probe other wireless devices; and number and type of ports open on the suspected wireless device.

In Example 33, the subject matter of any one of Examples 26 to 32 may include, wherein detecting includes determining the suspected wireless device is compromised based on the calculated threat level of the suspected wireless device.

In Example 34, the subject matter of any one of Examples 26 to 33 may include, wherein the leader of the cluster proxies all communications that are to be transmitted by or to be received by any other wireless device in the cluster.

In Example 35, the subject matter of any one of Examples 26 to 34 may include, wherein preventing the compromised wireless device from compromising another wireless device includes refusing to transmit a communication generated by the compromised wireless device.

In Example 36, the subject matter of any one of Examples 26 to 35 may include, wherein preventing the compromised wireless device from compromising another wireless device includes refusing to transmit a communication to be delivered to the compromised wireless device.

In Example 37, the subject matter of any one of Examples 26 to 36 may include, wherein preventing the compromised wireless device from compromising another wireless device includes forcing the compromised wireless device to reset itself to an uncompromised state.

In Example 38, the subject matter of any one of Examples 26 to 37 may include, wherein the cluster comprises wireless devices of a similar type.

In Example 39, the subject matter of any one of Examples 26 to 38 may include, wherein the wireless devices in the cluster are redundant.

In Example 40, the subject matter of any one of Examples 26 to 39 may include, wherein the plurality of wireless devices are organized into a plurality of clusters.

In Example 41, the subject matter of any one of Examples 26 to 40 may include, wherein each cluster performs health checks by sharing, with its neighbor clusters, its described expected behaviors and its sensor data.

In Example 42, the subject matter of any one of Examples 26 to 41 may include, wherein a subset of clusters within the plurality of clusters are organized into a cluster of clusters.

In Example 43, the subject matter of any one of Examples 26 to 42 may include, wherein a selected cluster within the plurality of clusters performs operations creating a super cluster by combining the selected cluster with other clusters from the plurality of clusters; cooperating with the other clusters in the super cluster to select a leader cluster for the super cluster; describing expected behaviors of the selected cluster; detecting a compromised cluster within the super cluster; and preventing the compromised cluster from compromising another cluster.

In Example 44, the subject matter of any one of Examples 26 to 43 may include, wherein the plurality of clusters are organized hierarchically.

In Example 45, the subject matter of any one of Examples 26 to 44 may include, wherein an upstream cluster is hierarchically higher than a downstream cluster.

In Example 46, the subject matter of any one of Examples 26 to 45 may include, wherein the wireless device describes its expected behaviors using XML.

In Example 47, the subject matter of any one of Examples 26 to 46 may include, wherein the wireless device broadcasts its description of expected behavior.

In Example 48, the subject matter of any one of Examples 26 to 47 may include, wherein the wireless device provides its description of expected behavior through an application programming interface.

In Example 49, the subject matter of any one of Examples 26 to 48 may include, wherein the description of expected behavior of the wireless device includes a parameter to be transmitted by or to be received by the wireless device, the parameter a name; a data type; and a range including: a bottom value, indicating a lowest value of the data type allowed for the parameter; and a top value, indicating a highest value of the data type allowed for parameter.

In Example 50, the subject matter of any one of Examples 26 to 49 may include, wherein the wireless device is configurable by an end customer.

Example 51 includes at least one machine-readable medium including instructions, which when executed by a machine, cause the machine to perform any of the Examples 26-50.

Example 52 includes an apparatus comprising means for performing any of the Examples 26-50.

Example 53 includes subject matter (such as a device, apparatus, or machine) for securing a wireless sensor network comprising a plurality of wireless devices, the device comprising: means for organizing the wireless device into a cluster with other wireless devices from the plurality; means for cooperating with the other wireless devices in the cluster to select a leader for the cluster; means for describing expected behaviors of the wireless device; means for detecting a compromised wireless device within the cluster; and means for preventing the compromised wireless device from compromising another wireless device.

In Example 54, the subject matter of Example 53 may include, wherein the means for detecting operates while the wireless device is the leader of the cluster.

In Example 55, the subject matter of any one of Examples 53 to 54 may include, wherein the means for preventing operates while the wireless device is the leader of the cluster.

In Example 56, the subject matter of any one of Examples 53 to 55 may include, wherein the means for preventing the compromised wireless device from compromising another wireless device includes means for instructing the other wireless devices in the cluster to select a new leader for the cluster in response to being compromised.

In Example 57, the subject matter of any one of Examples 53 to 56 may include, wherein the means for detecting a compromised wireless device within the cluster includes: means for analyzing communications of a suspected wireless device; and means for identifying anomalies in the communications of the suspected wireless device.

In Example 58, the subject matter of any one of Examples 53 to 57 may include, wherein the means for identifying anomalies in communications of the suspected wireless device includes means for utilizing a machine learning algorithm.

In Example 59, the subject matter of any one of Examples 53 to 58 may include, wherein the means for detecting includes means for calculating a threat level of the suspected wireless device based on at least one of: amount of deviation from described expected behavior of the suspected wireless device; proximity of the suspected wireless device to similar wireless devices; attempts by the suspected wireless device to probe other wireless devices; and number and type of ports open on the suspected wireless device.

In Example 60, the subject matter of any one of Examples 53 to 59 may include, wherein the means for detecting includes means for determining the suspected wireless device is compromised based on the calculated threat level of the suspected wireless device.

In Example 61, the subject matter of any one of Examples 53 to 60 may include, wherein the leader of the cluster includes means for proxying all communications that are to be transmitted by or to be received by any other wireless device in the cluster.

In Example 62, the subject matter of any one of Examples 53 to 61 may include, wherein the means for preventing the compromised wireless device from compromising another wireless device includes means for refusing to transmit a communication generated by the compromised wireless device.

In Example 63, the subject matter of any one of Examples 53 to 62 may include, wherein the means for preventing the compromised wireless device from compromising another wireless device includes means for refusing to transmit a communication to be delivered to the compromised wireless device.

In Example 64, the subject matter of any one of Examples 53 to 63 may include, wherein the means for preventing the compromised wireless device from compromising another wireless device includes means for forcing the compromised wireless device to reset itself to an uncompromised state.

In Example 65, the subject matter of any one of Examples 53 to 64 may include, wherein the cluster comprises wireless devices of a similar type.

In Example 66, the subject matter of any one of Examples 53 to 65 may include, wherein the wireless devices in the cluster are redundant.

In Example 67, the subject matter of any one of Examples 53 to 66 may include, wherein the plurality of wireless devices are organized into a plurality of clusters.

In Example 68, the subject matter of any one of Examples 53 to 67 may include, wherein each cluster includes means for performing health checks by sharing, with its neighbor clusters, its described expected behaviors and its sensor data.

In Example 69, the subject matter of any one of Examples 53 to 68 may include, wherein a subset of clusters within the plurality of clusters are organized into a cluster of clusters.

In Example 70, the subject matter of any one of Examples 53 to 69 may include, wherein a selected cluster within the plurality of clusters includes: means for creating a super cluster by combining the selected cluster with other clusters from the plurality of clusters; means for cooperating with the other clusters in the super cluster to select a leader cluster for the super cluster; means for describing expected behaviors of the selected cluster; means for detecting a compromised cluster within the super cluster; and means for preventing the compromised cluster from compromising another cluster.

In Example 71, the subject matter of any one of Examples 53 to 70 may include, wherein the plurality of clusters are organized hierarchically.

In Example 72, the subject matter of any one of Examples 53 to 71 may include, wherein an upstream cluster is hierarchically higher than a downstream cluster.

In Example 73, the subject matter of any one of Examples 53 to 72 may include, wherein the wireless device includes means for describing its expected behaviors using XML.

In Example 74, the subject matter of any one of Examples 53 to 73 may include, wherein the wireless device includes means for broadcasting its description of expected behavior.

In Example 75, the subject matter of any one of Examples 53 to 74 may include, wherein the wireless device includes means for providing its description of expected behavior through an application programming interface.

In Example 76, the subject matter of any one of Examples 53 to 75 may include, wherein the description of expected behavior of the wireless device includes a parameter to be transmitted by or to be received by the wireless device, the parameter a name; a data type; and a range including: a bottom value, indicating a lowest value of the data type allowed for the parameter; and a top value, indicating a highest value of the data type allowed for parameter.

In Example 77, the subject matter of any one of Examples 53 to 76 may include, wherein the wireless device includes means for being configured by an end customer.

Example 78 includes a wireless network including a plurality of wireless devices according to any of the devices of claims 1-25.

Conventional terms in the fields of computer networking and computer systems have been used herein. The terms are known in the art and are provided only as a non-limiting example for convenience purposes. Accordingly, the interpretation of the corresponding terms in the claims, unless stated otherwise, is not limited to any particular definition.

Thus, the terms used in the claims should be given their broadest reasonable interpretation.

Although specific embodiments have illustrated and described herein, it will be appreciated by those of ordinary skill in the art that any arrangement that is calculated to achieve the same purpose may be substituted for the specific embodiments shown. Many adaptations will be apparent to those of ordinary skill in the art. Accordingly, this application is intended to cover any adaptations or variations.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein may be machine or computer-implemented at least in part. Some examples may include a machine-readable medium or machine-readable medium encoded with instructions operable to configure an electronic device to perform methods as described in the above examples. An implementation of such methods may include code, such as microcode, assembly language code, a higher-level language code, or the like. Such code may include machine-readable instructions for performing various methods. The code may form portions of computer program products. Further, in an example, the code may be tangibly stored on one or more volatile, non-transitory, or non-volatile tangible machine-readable media, such as during execution or at other times. Examples of these tangible machine-readable media may include, but are not limited to, hard disks, removable magnetic disks, removable optical disks (e.g., compact disks and digital video disks), magnetic cassettes, memory cards or sticks, random access memories (RAMs), read-only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure and is submitted with the understanding that it will not be used to interpret or limit the scope or meaning of the claims.

In this Detailed Description, various features may have been grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments may be combined with each other in various combinations or permutations. The scope of the embodiments should be determined with reference to the appended claims, along with the full scope of equivalents to which such claims are entitled.

What is claimed is:

1. At least one non-transitory machine-readable storage device comprising instructions, wherein the instructions, when executed by a processing circuitry of a computing device operable in a communication network, cause the processing circuitry to perform operations that:
   identify configurations associated with appropriate behaviors for a plurality of network devices arranged within a hierarchical structure in the communication network, wherein the configurations for a network device of the plurality of network devices include at least one data parameter associated with a number of ports used by the network device;
   monitor active behavior of the plurality of network devices within the hierarchical structure via a corresponding plurality of communication paths;
   detect a compromised device of the plurality of network devices based on identification of an anomaly from the appropriate behaviors, the anomaly determined from the configurations observed during the monitoring of the active behavior; and
   cause initiation of an automated mitigation action to modify the compromised device.

2. The machine-readable storage device of claim 1, wherein the instructions further cause the processing circuitry to perform operations that:
   receive input to organize the plurality of network devices within the communication network into the hierarchical structure.

3. The machine-readable storage device of claim 2, wherein the instructions further cause the processing circuitry to perform operations that:
   receive the input to organize the plurality of network devices into the hierarchical structure based on device function associated with the plurality of network devices.

4. The machine-readable storage device of claim 2, wherein the instructions further cause the processing circuitry to perform operations that:
   receive the input to organize the plurality of network devices into the hierarchical structure based on physical proximity of the plurality of network devices within a location.

5. The machine-readable storage device of claim 1, wherein the instructions further cause the processing circuitry to perform operations that:
   identify the anomaly based on a comparison of the configurations observed during the monitoring of the active behavior with a known set of configurations.

6. The machine-readable storage device of claim 1, wherein to identify the configurations associated with the appropriate behaviors, the instructions further cause the processing circuitry to perform operations that:
define a permissible number of open ports on a network device of the plurality of network devices.

7. The machine-readable storage device of claim 6, wherein the instructions further cause the processing circuitry to perform operations that:
identify the anomaly based on detecting a number of open ports for the network device is different from the permissible number of open ports.

8. The machine-readable storage device of claim 6, wherein the instructions further cause the processing circuitry to perform operations that:
identify the anomaly based on detecting a number of open ports for the network device is higher than the permissible number of open ports.

9. The machine-read, He storage device of claim 6, wherein the instructions further cause the processing circuitry to perform operations that:
identify the anomaly based on detecting a number of open ports for the network device is lower than the permissible number of open ports.

10. The machine-readable storage device of claim 1, wherein the instructions further cause the processing circuitry to perform operations that:
perform the automated mitigation action to modify the compromised device.

11. The machine-readable storage device of claim 10, wherein the automated mitigation action includes configuring the compromised device to an uncompromised device state.

12. The machine-readable storage device of claim 11, wherein the automated mitigation action is a factory reset causing configuration of the compromised device to the uncompromised device state.

13. A computing device in a communication network, comprising:
a network interface card (NIC); and
processing circuitry coupled to the NIC, the processing circuitry configured to perform operations to:
identify configurations associated with appropriate behaviors for a plurality of network devices arranged within a hierarchical structure in the communication network, wherein the configurations for a network device of the plurality of network devices include at least one data parameter associated with a number of ports used by the network device;
monitor active behavior of the plurality of network devices within the hierarchical structure via a corresponding plurality of communication paths associated with the NIC;
detect a compromised device of the plurality of network devices based on identification of an anomaly from the appropriate behaviors, the anomaly determined from the configurations observed during the monitoring of the active behavior; and
cause initiation of an automated mitigation action to modify the compromised device.

14. The computing device of claim 13, wherein the processing circuitry is further configured to:
receive input to organize the plurality of network devices within the communication network into the hierarchical structure.

15. The computing device of claim 14, wherein the processing circuitry is further configured to:
receive the input to organize the plurality of network devices into the hierarchical structure based on device function associated with the plurality of network devices.

16. The computing device of claim 14, wherein the processing circuitry, is further configured to:
receive the input to organize the plurality of network devices into the hierarchical structure based on physical proximity of the plurality of network devices within a location.

17. The computing device of claim 13, wherein the processing circuitry is further configured to:
identify the anomaly based on a comparison of the configurations observed during the monitoring of the active behavior with a known set of configurations.

18. The computing device of claim 13, wherein to identify the configurations associated with the appropriate behaviors, the processing circuitry is further configured to:
define a permissible number of open ports on a network device of the plurality of network devices.

19. The computing device of claim 18, wherein the processing circuitry is further configured to:
identify the anomaly based on detecting a number of open ports for the network device is different from the permissible number of open ports.

20. The computing device of claim 18, wherein the processing circuitry is further configured to:
identify the anomaly based on detecting a number of open ports for the network device is higher than the permissible number of open ports.

21. A method performed by processing circuitry within a communication network, the method comprising:
identifying configurations associated with appropriate behaviors for a plurality of network devices arranged within a hierarchical structure in the communication network, wherein the configurations for a network device of the plurality of network devices include at least one data parameter associated with a number of ports used by the network device;
monitoring active behavior of the plurality of network devices within the hierarchical structure via a corresponding plurality of communication paths;
detecting a compromised device of the plurality of network devices based on identification of an anomaly from the appropriate behaviors, the anomaly determined from the configurations observed during the monitoring of the active behavior; and
causing initiation of an automated mitigation action to modify the compromised device.

22. The method of claim 21, further comprising:
receiving input to organize the plurality of network devices within the communication network into the hierarchical structure.

23. The method of claim 22, further comprising:
receiving the input to organize the plurality of network devices into the hierarchical structure based on device function associated with the plurality of network devices.

24. The method of claim 22, further comprising:
receiving the input to organize the plurality of network devices into the hierarchical structure based on physical proximity of the plurality of network devices within a location.

25. The method of claim 21, further comprising:
identifying the anomaly based on a comparison of the configurations observed during the monitoring of the active behavior with a known set of configurations.

26. The method of claim 21, wherein identifying the configurations associated with the appropriate behaviors further comprises:
 defining a permissible number of open ports on a network device of the plurality of network devices.

* * * * *

UNITED STATES PATENT AND TRADEMARK OFFICE
CERTIFICATE OF CORRECTION

PATENT NO. : 10,986,503 B2
APPLICATION NO. : 16/418761
DATED : April 20, 2021
INVENTOR(S) : Vaughn et al.

It is certified that error appears in the above-identified patent and that said Letters Patent is hereby corrected as shown below:

In the Claims

In Column 19, Line 20, in Claim 9, delete "machine-read, He" and insert --machine-readable-- therefor In Column 20, Line 8, in Claim 16, delete "circuitry," and insert --circuitry-- therefor Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*